Patented Sept. 28, 1954

2,690,440

UNITED STATES PATENT OFFICE 2,690,440

ALKYLTHIOSULFENYL DITHIOCARBAMATES AND THEIR PREPARATION

Chester M. Himel, Menlo Park, Calif., and Lee O. Edmonds, Bartlesville, Okla., assignors to Phillips Petroleum Company, a corporation of Delaware No Drawing. Application October 29, 1951, Serial No. 253,765

23 Claims. (Cl. 260—247.1)

This invention relates to new compositions and their manufacture. In one aspect this invention relates to alkylthiosulfenyl dithiocarbamates and their preparation. This application is a continuation-in-part of our copending application Serial Number 59,025, filed November 8, 1948, now Patent No. 2,572,845.

An object of our invention is to provide alkylthiosulfenyl dithiocarbamates as new compositions. Another object is to provide a process for the manufacture of alkylthiosulfenyl dithiocarbamates. Other objects will be apparent to one skilled in the art from accompanying discussion and disclosure.

In accordance with our invention we provide new and novel chemical compounds, alkylthiosulfenyl dithiocarbamates, having a composition in accordance with the following structural formula:

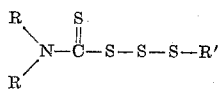

wherein each R is selected from the group consisting of aryl, aralkyl and alkaryl radicals, containing not more than 10 carbon atoms, and radicals which together with the nitrogen form a heterocyclic ring, wherein one R can also be a radical selected from the group consisting of hydrogen, and an alkyl containing not more than 10 carbon atoms, and wherein R' is selected from the group consisting of primary, secondary and tertiary alkyl radicals containing not more than 10 carbon atoms. In our preferred compositions containing the heterocyclic ring, the said heterocyclic ring is saturated and contains from 5–7 atoms selected from the group consisting of carbon, nitrogen, sulfur, and oxygen, at least one of which is the said N set forth in the structural formula hereinabove, and at least three of which are carbon. Our preferred process for producing the compounds of our invention is from the interaction of alkylthiosulfenyl halides with the salts of N-substituted dithiocarbamic acids. These products have numerous potential uses, such as rubber vulcanization accelerators, fungicides, intermediates for the production of valuable organic chemicals, and the like.

In the practice of a preferred embodiment of our invention we prepare our new compositions by slowly adding an alkylthiosulfenyl halide, preferably in solution in a chemically inert organic solvent, to an aqueous solution of a suitable salt of an N-substituted dithiocarbamic acid, the system being well agitated during the addition. The resulting reaction mixture is then stirred usually from 3 to 10 minutes after which the product is recovered.

The dithiocarbamates employed in the practice of our invention are those having a composition in accordance with the following structural formula:

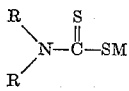

wherein each R is selected from the group consisting of aryl, aralkyl and alkaryl radicals containing not more than 10 carbon atoms, and radicals which together with the nitrogen form a heterocyclic ring, wherein one R can also be a radical selected from the group consisting of hydrogen, and an alkyl containing not more than 10 carbon atoms, and wherein M is selected from the group consisting of alkali metals and alkaline earth metals.

The alkylthiosulfenyl halides employed in this invention are compounds having the general formula: R'—S—S—X wherein R' is selected from the group consisting of primary, secondary and tertiary alkyl radicals containing not more than 10 carbon atoms and wherein X is selected from the group consisting of chlorine, bromine and iodine.

When employing an organic solvent in the introduction of the alkyl-thiosulfenyl halide to the reaction as already described, we prefer as such a solvent any low-boiling saturated hydrocarbon such as normal pentane, isopentane, light saturated naphthas, mixtures of low-boiling inert hydrocarbons, and the like, boiling in the range of —10 to 60° C., although higher boiling solvents may be advantageously employed in some cases, as where higher molecular weight reactants are employed. We often prefer to dissolve the alkylthiosulfenyl halide in the selected organic solvent, in an amount of from 0.25 to 2 moles per liter of solvent. Temperatures most usually applicable to the practice of our invention are within the range of from about —10 to 60° C., although more generally we prefer to operate in a range of from 10 to 40° C. Pressures are generally atmospheric although higher pressures may be employed, if desired. In general, it is preferable to conduct the reaction in a vessel with a reflux condenser. By so operating the temperature is easily controlled at a desired level, and also a convenient means of agitation for the system is thereby provided, by the ebullition of the low-boiling inert solvent. It is to be understood that it is within the scope of our invention to conduct the product-forming step of our process in the absence of an inert organic solvent, and that we employ this solvent as a means for controlling the reaction, to proceed at a rate conducive to producing optimum yields of desired product, in view of the highly active nature of the alkylthiosulfenyl halides.

In another embodiment of our invention we may prepare our new compounds in a single inert solvent medium utilizing a solvent of the type already described. In the practice of this embodiment the reactants may be introduced to the reaction system in any desired manner. For example, solid N-substituted dithiocarbamate may be introduced to an alkylthiosulfenyl halide in solution in the inert organic solvent in a desired proportion, at any desired rate, or the halide in solution in the inert organic solvent may be introduced to the N-substituted dithiocarbamate when suspended in another portion of the same organic solvent.

We prefer to employ equimolar proportions of reactants in our process, although if desired, an excess of reactant may be used.

Examples of the compositions provided in accordance with our invention are:

N-phenyl-S-tert-butylthiosulfenyl dithiocarbamate
N,N-diphenyl-S-n-propylthiosulfenyl dithiocarbamate
N-benzyl-S-heptylthiosulfenyl dithiocarbamate
N-beta-phenylethyl-S-octylthiosulfenyl dithiocarbamate
N-gamma phenylpropyl - S - pentylthiosulfenyl dithiocarbamate
N - beta - phenylethyl - N - methyl - S - n - propylthiosulfenyl dithiocarbamate
N-beta-phenylbutyl-S-tert-butylthiosulfenyl dithiocarbamate
N - gamma naphthylpropyl-S-tert-butylthiosulfenyl dithiocarbamate
N-benzyl-N-pentyl-S-n-propylthiosulfenyl dithiocarbamate
N,N-ditolyl-S-n-butylthiosulfenyl dithiocarbamate
N-xylyl-S-hexylthiosulfenyl dithiocarbamate
N-(diethylphenyl)-S-octylthiosulfenyl dithiocarbamate
N - (para - dimethylphenyl) - S - tert - butylthiosulfenyl dithiocarbamate
N-ethylphenyl-N-n-butyl-S - tert - butylthiosulfenyl dithiocarbamate
N-benzyl-N-methyl-S-tert-butylthiosulfenyl dithiocarbamate
Pentamethylene-S-tert-butylthiosulfenyl dithiocarbamate
3 - oxapentamethylene - S - n-propylthiosulfenyl dithiocarbamate
3 - azapentamethylene - S - tert - butylthiosulfenyl dithiocarbamate
3-thiapentamenthylene-S-pentylthiosulfenyl dithiocarbamate
2 - methylpentamethylene - S - tert - butylthiosulfenyl dithiocarbamate
Tetramethylene-S-tert-butylthiosulfenyl dithiocarbamate
Hexamethylene-S-tert-butylthiosulfenyl dithiocarbamate
2 - methyltetramethylene - S - n - propylthiosulfenyl dithiocarbamate
3-methylhexamethylene-S-hexylthiosulfenyl dithiocarbamate
2-ethyltetramethylene-S-tert - butylthiosulfenyl dithiocarbamate
2 - propylhexamethylene-S-n-propylthiosulfenyl dithiocarbamate Examples of the N-substituted dithiocarbamate salts employed as reactants in accordance with the process of our invention are:

Sodium N-phenyl-N-methyl dithiocarbamate
Calcium N-phenyldithiocarbamate
Potassium N-benzyl-N-phenyl dithiocarbamate
Barium N-beta-phenylethyl dithiocarbamate
Sodium N-gamma-phenylpropyldithiocarbamate
Sodium N-betaphenylbutyldithiocarbamate
Potassium N - gamma - naphthylpropyldithiocarbamate
Strontium N-tolyldithiocarbamate
Sodium N-tolyl-N-propyl-dithiocarbamate
Potassium N - ethylphenyl - N - tolyl - dithiocarbamate
Barium N-para-dimethylphenyldithiocarbamate
Sodium phenylethyldithiocarbamate
Sodium pentamethylene dithiocarbamate
Potassium 3-oxapentamethylene dithiocarbamate
Sodium 3-azapentamethylene dithiocarbamate
Sodium 3-thiopentamethylene dithiocarbamate
Potassium tetramethylene dithiocarbamate
Potassium hexamethylene dithiocarbamate
Sodium 2-methyl-hexamethylene dithiocarbamate
Sodium 3-ethyl-pentamethylene dithiocarbamate
Sodium 2-methyl tetramethylene dithiocarbamate Examples of alkyl thiosulfenyl halides employed as reactants in the process of our invention are:

n-Butylthiosulfenyl chloride
Tert-butylthiosulfenyl chloride
i-Propylthiosulfenyl bromide
Hexylthiosulfenyl iodide
Octylthiosulfenyl bromide
Decylthiosulfenyl chloride
i-Pentylthiosulfenyl chloride
Methylthiosulfenyl bromide
n-Propylthiosulfenyl chloride Our invention is illustrated by the following examples. The reactants, their proportions, and other specific ingredients are presented as being typical and should not be construed to limit the invention unduly.

N - 3 - oxapentamethylene - S - tert - butylthiosulfenyl dithiocarbamate, N-pentamethylene-S-tert-butylthiosulfenyl dithiocarbamate, N-tetramethylene-S-tert-butylthiosulfenyl dithiocarbamate, and N-betaphenylethyl-S-tert-butylthiosulfenyl dithiocarbamate were each prepared by reacting tert-butylthiosulfenyl chloride respectively with (1) sodium 3-oxapentamethylene dithiocarbamate, (2) sodium pentamethylene dithiocarbamate, (3) sodium tetramethylene dithiocarbamate, and (4) sodium N-betaphenylethyl dithiocarbamate, as described hereinafter. In the preparation of the tert-butylthiosulfenyl dithiocarbamate, tert-butyldisulfide and isopentane were charged in proportions of about 900 cc. of isopentane per mol of the disulfide to a reaction flask equipped with a stirrer, thermometer, and a bubbler inlet for admitting chlorine. The reaction flask was partially immersed in a Dry Ice-acetone bath. After flushing the reaction flask with nitrogen, agitation of the isopentane-disulfide mixture was started, and, after the temperature had dropped to −40° F., chlorine gas was bubbled into the solution through the bubbler inlet. The temperature of the solution was maintained between −40° F. and −50° F. by controlling the flow of chlorine therethrough. One mol of chlorine was introduced into the reaction flask per mol of disulfide initially charged. After chlorination, the Dry Ice bath was removed and a resulting isopentane solution of tert-butylthiosulfenyl chloride was allowed to warm to about 50° F.

Each of the dithiocarbamate reactants described above was prepared in a reaction flask equipped with a stirrer, a Dry Ice condenser, and a dropping funnel, in an equal molar amount, based on the quantity of tert-butylthiosulfenyl chloride prepared as described above. In carrying out the preparation of each sodium dithiocarbamate reactant, a 10 per cent excess of sodium hydroxide together with 300 cc. of water per mol of the sodium hydroxide, was charged to the reaction flask. After the sodium hydroxide had dissolved and the solution cooled to room temperature, one mol of an amine (morpholine in the preparation of sodium 3-oxapentamethylene dithiocarbamate; piperidine in the preparation of sodium pentamethylene dithiocarbamate; pyrrolidine in the preparation of sodium tetraamethylene dithiocarbamate; and beta-phenylethylamine in the preparation of sodium N-betaphenylethyl dithiocarbamate) per mol of the tertiary butylthiosulfenyl chloride prepared, was charged to the reaction flask. An equal molar quantity of carbon disulfide, based on the added amine, was added to the solution in the reaction flask through the dropping funnel during which time that solution was stirred vigorously. Subsequent to addition of the carbon disulfide, the resulting water solution was cooled to room temperature (about 70° F.) and the isopentane solution of tert-butylthiosulfenyl chloride prepared as set forth hereinabove was gradually added to the reaction flask through the dropping funnel. After this addition, the resulting reaction mixture was stirred for about 30 minutes. The water phase and isopentane phase then separated into two layers, and the water phase was discarded. The separated isopentane phase was washed with water and the isopentane was stripped therefrom by heating the solution to 122° F. at 10 mm. Hg. absolute pressure. The residual product of stripping was an oil phase constituting the desired alkylthiosulfenyl dithiocarbamate product of the reaction. The following tabulation sets forth the products formed in each case, in terms of yield, density and index of refraction:

*Oil product recovered*

| Product | Mole Percent Yield | Density of Oil $d_4^{20}$ | Index of Refraction of Oil, $n_D^{20}$ |
|---|---|---|---|
| pentamethylene-S-tert-butyl-thiosulfenyl dithiocarbamate | 79.8 | 1.1531 | 1.6084 |
| 3-oxapentamethylene-S-tert-butyl-thiosulfenyl dithiocarbamate | 68.4 | 1.1869 | 1.6018 |
| tetramethylene-S-tert-butyl-thiosulfenyl dithiocarbamate | 45.9 | 1.1330 | 1.5921 |
| N-beta-phenylethyl-S-tert-butyl-thiosulfenyl dithiocarbamate | 50.4 | 1.1031 | 1.5868 |

We claim:
1. A process for the preparation of an alkylthiosulfenyl dithiocarbamate having a composition in accordance with the structural formula:

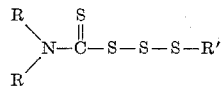

wherein each R is selected from the group consisting of aryl hydrocarbon, aralkyl and alkaryl radicals containing not more than 10 carbon atoms, and radicals which together form a divalent radical selected from the group consisting of pentamethylene, 3-monooxapentamethylene, 3 - monoazapentamethylene, 3 - monothia-pentamethylene, 2 - methylpentamethylene, tetramethylene, hexamethylene, 2-methyltetramethylene, 3-methylhexamethylene, 2-ethyltetramethylene, 2-propylhexamethylene, said divalent radical forming a heterocyclic ring with the nitrogen, wherein one R can also be a radical selected from the group consisting of hydrogen, and an alkyl containing not more than 10 carbon atoms, and wherein R' is selected from the group consisting of primary, secondary, and tertiary alkyl radicals, containing not more than 10 carbon atoms, said method comprising reacting an alkylthiosulfenyl halide having a composition in accordance with the structural formula, $$R'-S-S-X$$

wherein R' is as above described, and wherein X is a halogen selected from the group consisting of chlorine, bromine and iodine, with a dithiocarbamate having a composition in accordance with the following structural formula:

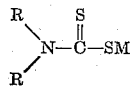

wherein each R is as above described and wherein M is selected from the group consisting of alkali and alkaline earth metals.

2. The process of claim 1 wherein said halide is dissolved in an inert organic solvent and is added to an aqueous solution of said dithiocarbamate.

3. The process of claim 2 wherein said solvent has a boiling point within the range of 10 to 40° C. and the reaction is conducted in the refluxing solvent.

4. The process of claim 3 wherein the reactants are introduced in equi-molar proportions.

5. The process of claim 1 wherein said reacting is effected in a chemically inert organic solvent at a temperature within the range of —10 to 60° C.

6. The process of claim 1 wherein said reacting is effected by dissolving said halide in an inert organic solvent boiling within the range of 10 to 40° C. and gradually adding the resulting solution to an aqueous solution of said dithiocarbamate under solvent refluxing conditions.

7. A process for the preparation of 3-oxapentamethylene - S - tert - butylthiosulfenyl dithiocarbamate comprising reacting sodium 3-oxapentamethylene dithiocarbamate with tert-butylthiosulfenyl chloride, effecting said reacting by dissolving said tert-butylthiosulfenyl chloride in a chemically inert organic solvent and gradually adding the resulting solution to an aqueous solution of said sodium 3-oxapentamethylene dithiocarbamate maintained at a temperature within the range of 10 to 40° C., and thereafter recovering 3 - oxapentamethylene - S - tert - butylthiosulfenyl dithiocarbamate product from the resulting reaction mixture.

8. A process for the preparation of pentamethylene - S - tert - butylthiosulfenyl dithiocarbamate comprising reacting sodium pentamethylene dithiocarbamate with tert-butylthiosulfenyl chloride, effecting said reacting by dissolving said tert-butylthiosulfenyl chloride in a chemically inert organic solvent and gradually adding the resulting solution to an aqueous solution of said sodium pentamethylene dithiocarbamate maintained at a temperature within the range of 10 to 40° C., and thereafter recovering pentamethylene-S-tert-butylthiosulfenyl dithiocarbamate product from the resulting reaction mixture.

9. A process for the preparation of tetramethylene - S - tert - butylthiosulfenyl dithiocarbamate comprising reacting sodium tetramethylene dithiocarbamate with tert-butylthiosulfenyl chloride, effecting said reacting by dissolving said tert-butylthiosulfenyl chloride in a chemically inert organic solvent and gradually adding the resulting solution to an aqueous solution of said sodium tetramethylene dithiocarbamate at a temperature within the range of 10 to 40° C., and thereafter recovering tetramethylene - S - tert - butylthiosulfenyl dithiocarbamate product from the resulting reacting mixture.

10. A process for the preparation of N-beta-phenylethyl-S-tert-butylthiosulfenyl dithiocarbamate comprising reacting sodium N-beta-phenylethyl dithiocarbamate with tert-butylthiosulfenyl chloride, effecting said reacting by dissolving said tert-butylthiosulfenyl chloride in a chemically inert organic solvent and gradually adding the resulting solution to an aqueous solution of said sodium N-beta-phenylethyl dithiocarbamate maintained at a temperature within the range of 10 to 40° C., and thereafter recovering N-beta-phenylethyl-S-tert-butylthiosulfenyl dithiocarbamate product from the resulting reaction mixture.

11. The process of claim 2 wherein said inert organic solvent is a pentane.

12. As a new composition of matter an alkylthiosulfenyl dithiocarbamate having a composition in accordance with the following structural formula:

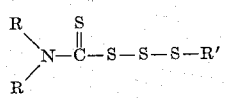

wherein each R is a radical selected from the group consisting of aryl hydrocarbon, aralkyl and alkaryl radicals containing not more than 10 carbon atoms, and radicals which together form a divalent radical selected from the group consisting of pentamethylene, 3-monooxapentamethylene, 3-monoazapentamethylene, 3-monothiapentamethylene, 2-methylpentamethylene, tetramethylene, hexamethylene, 2-methyltetramethylene, 3-methylhexamethylene, 2-ethyltetramethylene, 2-propylhexamethylene, said divalent radical forming a heterocyclic ring with the nitrogen, wherein one R can also be a radical selected from the group consisting of hydrogen and an alkyl containing not more than 10 carbon atoms, and wherein R' is selected from a group consisting of primary, secondary, and tertiary alkyl radicals, containing not more than 10 carbon atoms.

13. A new compound characterized by the structural formula

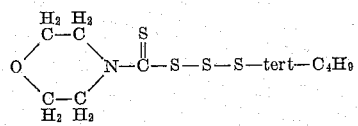

14. A new compound characterized by the structural formula

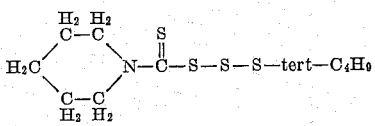

15. A new compound characterized by the structural formula

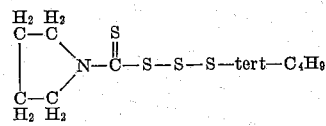

16. A new compound characterized by the structural formula

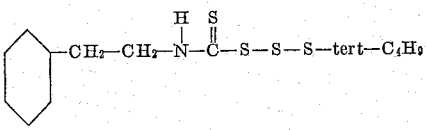

17. A new compound characterized by the structural formula

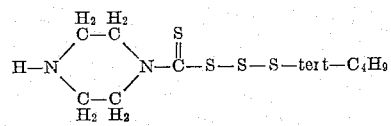

18. A process for the preparation of 3-azapentamethylene-S-tert-butylthiosulfenyl dithiocarbamate comprising reacting an alkali metal 3-azapentamethylene dithiocarbamate with a tert-butylthiosulfenyl halide selected from the group consisting of chloride, bromide and iodide, and recovering 3-azapentamethylene-S-tert-butylthiosulfenyl dithiocarbamate as a product of the process.

19. A process for the preparation of 3-oxapentamethylene-S-tert-butylthiosulfenyl dithiocarbamate which comprises reacting an alkali metal 3 - oxapentamethylene dithiocarbamate with a tert-butyl thiosulfenyl halide selected from the group consisting of chloride, bromide and iodide, and recovering 3-oxapentamethylene-S-tert-butylthiosulfenyl dithiocarbamate as a product of the process.

20. A process for the preparation of pentamethylene-S-tert-butylthiosulfenyl dithiocarbamate which comprises reacting an alkali metal pentamethylene dithiocarbamate with a tert-butylthiosulfenyl halide selected from the group consisting of chloride, bromide and iodide, and recovering pentamethylene-S-tert-butylthiosulfenyl dithiocarbamate as a product of the process.

21. A process for the preparation of tetramethylene-S-tert-butylthiosulfenyl dithiocarbamate which comprises reacting an alkali metal tetramethylene dithiocarbamate with a tert-butylthiosulfenyl halide selected from the group consisting of chloride, bromide and iodide, and recovering tetramethylene-S-tert-butylthiosulfenyl dithiocarbamate as a product of the process.

22. A process for the preparation of N-beta-phenylethyl-S-tert-butylthiosulfenyl dithiocarbamate which comprises reacting an alkali metal N-beta-phenylethyl dithiocarbamate with a tert-butylthiosulfenyl halide selected from the group consisting of chloride, bromide and iodide, and recovering N-beta-phenylethyl-S-tert-butylthiosulfenyl dithiocarbamate as a product of the process.

23. The process of claim 1 wherein the temperature of said reacting is within the range of —10 to +60° C.

References Cited in the file of this patent

UNITED STATES PATENTS

| Number | Name | Date |
| --- | --- | --- |
| 2,368,515 | Blake | Jan. 30, 1945 |
| 2,390,713 | Hunt | Dec. 11, 1945 |